United States Patent Office 3,478,072
Patented Nov. 11, 1969

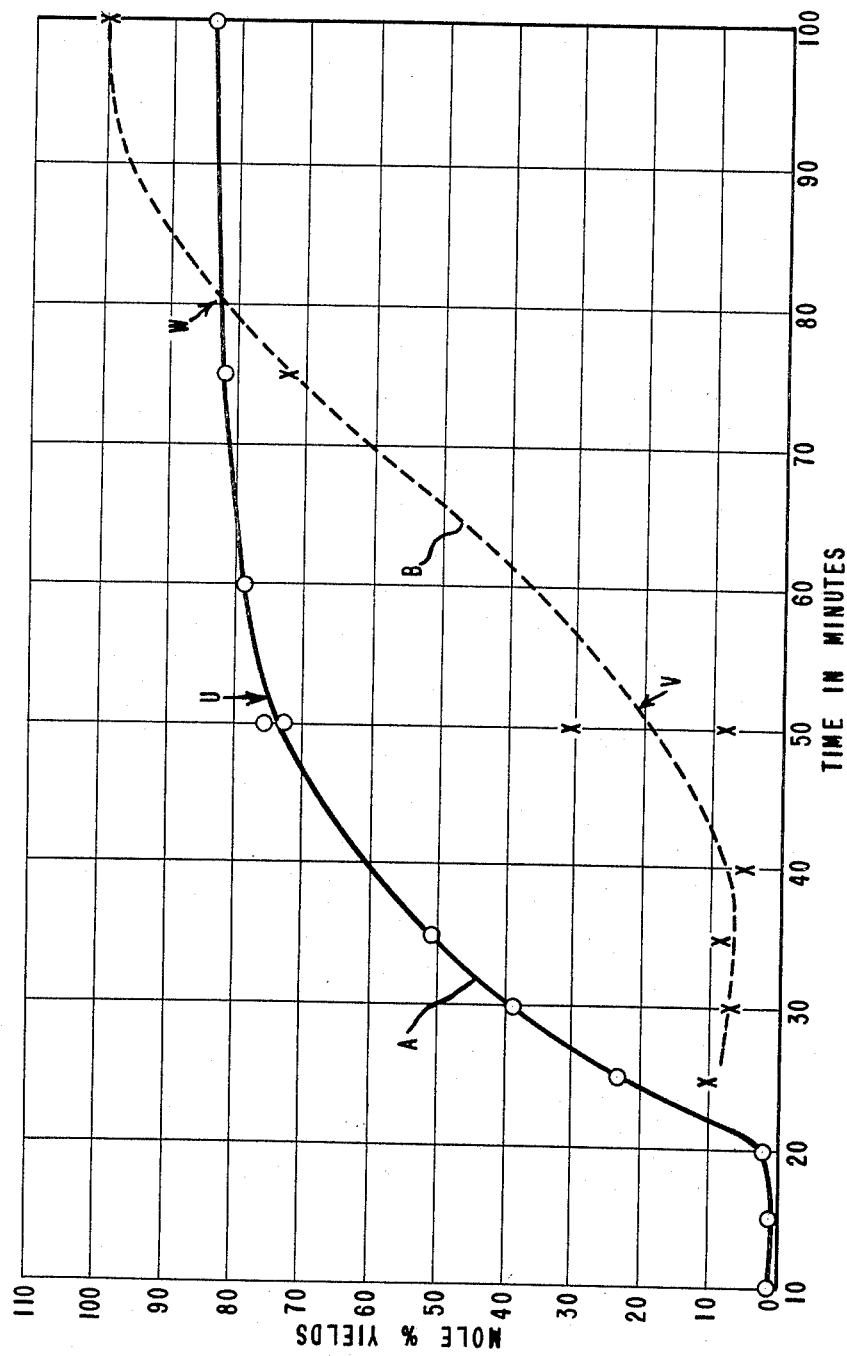

3,478,072
PREPARATION OF TETRAMETHYLETHYL LEADS
Jerry M. Barton, Wilmington, Del., assignor to E. I. du Pont de Nemours and Company, Wilmington, Del., a corporation of Delaware
Filed Aug. 8, 1967, Ser. No. 659,184
Int. Cl. C07f 7/26
U.S. Cl. 260—437                    5 Claims

ABSTRACT OF THE DISCLOSURE

Rapid single vessel preparation of redistributed tetramethylethyl lead compositions by contacting sodium lead alloy, methyl chloride and tetraethyl lead in the presence of a catalyst under carefully controlled time-temperature conditions.

---

This invention relates to the preparation of redistributed tetramethylethyl lead compositions comprising tetramethyl lead, trimethylethyl lead, dimethyldiethyl lead, methyltriethyl lead and tetraethyl lead, and in particular to efficiently preparing such compositions by contacting sodium lead alloy, methyl chloride and tetraethyl lead in the presence of a catalyst which serves both to catalyze the formation of tetramethyl lead and to catalyze the redistribution between the tetramethyl lead so produced and the tetraethyl lead already present. These redistributed compositions are especially useful in commercial antiknock fluids.

Background of the invention

The prior art discloses the preparation of tetramethyl lead by mixing sodium lead alloy, methyl chloride, an aluminum halide and an alkyl lead compound (preferably tetramethyl lead but including illustratively, tetraethyl lead) at about room temperature, initiating the methylation reaction at about 50–70° C., and then completing the reaction at about 70° C. to about 130° C. The purpose of the alkyl lead compound is to smooth out the reaction induction.

It is also known to carry out redistribution of tetramethyl and tetraethyl leads in the presence of catalysts such as boron trifluorides at ambient temperatures.

It has now been found, in accordance with the present invention, that both methylation and redistribution can be carried out in one operation in approximately the same time as the prior art's methylation process alone, despite the fact that methylation is nearly complete before significant redistribution begins, by carefully controlling the time-temperature relationship.

Summary of the invention

The instant process for manufacturing redistribution mixtures containing tetramethyl lead, trimethylethyl lead, dimethyldiethyl lead, methyltriethyl lead and tetraethyl lead involves the steps of (1) Contacting sodium lead alloy, in a single pressure vessel under an inert atmosphere, with from about 0.006 to about 0.04 mole, per mole of sodium, of a catalyst selected from an aluminum halide, an alkylaluminum or an alkylaluminum halide, from about 1.1 to 5.0 moles, per mole of sodium, of methyl chloride and from about 0.11 to 0.44 mole, per mole of sodium, of tetraethyl lead;

(2) Heating the vessel contents under agitation to between about 100° C. and 105° C. in about 20 minutes, to between about 110° C. and 130° C. in about another 10 minutes, and maintaining the temperature at between about 110° C. and 130° C. for about an additional 55 to 70 minutes to accomplish both substantially complete methylation and substantially complete redistribution of the tetramethyl lead formed by methylation with the tetraethyl lead added initially; and (3) Recovering the redistributed tetramethylethyl leads.

The preferred catalysts are aluminum chloride, trimethylaluminum and ethylaluminum sesquichloride. Operable aluminum and alkylaluminum halides include those formed from chlorine, bromine and iodine. By alkylaluminum is meant those in which the alkyl group(s) contain from one to four carbon atoms, methyl and ethyl being the preferred groups.

In carrying out the process of this invention, there may optionally be added in step 1 above dry toluene as a decomposition inhibitor and comminuted graphite to ease vessel agitation.

BRIEF DESCRIPTION OF DRAWING

The drawing demonstrates graphically the time lag between methylation and redistribution in carrying out the process of this invention. A more detailed discussion of the drawing is found in Example II below.

DISCUSSION OF INVENTION

Methylation and redistribution defined

In the process of this invention the formation of tetramethyl lead is included in the term methylation. As is well known, practical methylation of sodium lead alloy with methyl chloride in the presence of a catalyst produces from about at least 60 to about 90 percent yields of tetramethyl lead based on the sodium lead alloy, the losses being due to side reactions of the catalyst and the formation of methane and ethane. Redistribution is understood to mean a reaction carried out in the presence of a catalyst in which the methyl and ethyl groups in a mixture comprising tetramethyl lead and tetraethyl lead are apportioned among all the lead atoms of the original mixture so that there results a mixture comprising five tetramethylethyl lead, viz., tetramethyl lead, trimethylethyl lead, dimethyldiethyl lead, methyltriethyl lead and tetraethyl lead. Hereafter, practical redistribution is taken to mean at least 50% redistribution. However, most preferably, redistribution is carried substantially to completion, i.e., to the point of a substantially complete (90 to 100%), statistical reapportionment of said methyl and said ethyl groups.

When methylation and resistribution are carried out in one operation, the yield of tetramethyl lead is taken to mean the yield of methyl-to-lead bonds, since, once redistribution initiates, the concentration of tetramethyl lead per se is reduced. Tetramethyl lead yield in this meaning is calculated from the results of iodine titration for total lead alkyls and from results of quantitative vapor phase chromatography, viz., tetramethyl lead (TML)

$$\text{yield} = \frac{(\text{mole percent methyl}) \times (\text{moles of lead alkyls titrated})}{(\text{theoretical moles of TML})}$$

wherein mole percent methyl =

$$\frac{4\,[\text{mole percent }(CH_3)_4\,Pb] + 3\,[\text{mole percent }(CH_3)_3\,C_2H_5\,Pb] + 2\,[\text{mole percent }(CH_3)_2(C_2H_5)_2\,Pb] + [\text{mole percent }CH_3\,(C_2H_5)_3\,Pb]}{4}$$

The vapor phase chromatographic procedure provides the percentage of the various methylethyl leads in the above equation and also, as is well known in the art, the mole percent redistribution.

Combined methylation and redistribution

As hereinabove discussed, prior art methylation processes, such as disclosed in U.S. Patent No. 3,048,610, achieved substantially complete methylation over a period of about one and one-half to six hours by gradual heat buildup. Redistribution is also taught as a separate process, generally at low temperatures. It has now been found that both methylation and redistribution can be accomplished in about 100 minutes or less by carefully controlling the time-temperature relation as discussed below. That this is extremely efficient is even more apparent when it is realized, as shown in the accompanying drawing which is discussed in further detail in Example II, that redistribution doesn't even become significant until methylation is substantially complete.

In carrying out the process of this invention, an agitated pressure vessel, which may be any of many suitable and well known types from small, steel methylation bombs up to full-scale commercial methylation vessels, is charged with sodium lead alloy, NaPb, with from about 0.006 to about 0.04 mole, per mole of sodium, of a methylation and redistribution catalyst, usually aluminum chloride, but also including aluminum bromide, aluminum iodide, tri lower alkyl aluminums and lower alkyl aluminum sesquichlorides, from about 1.1 to about 5 miles, per mole of sodium, of methyl chloride and about 0.11 to about 0.44 mole, per mole of sodium, of tetraethyl lead. These numerical ranges represent extremes of operable ranges. With about 0.006 moles or less of catalyst per mole of sodium, methylation and redistribution rates become impractically slow. More than 0.04 mole of catalyst is unnecessary and, especially with the aluminum halides above, even harmful in that the catalyst can react with sodium in the sodium lead alloy, with the methyl chloride, the tetramethyl lead, the tetraethyl lead on their redistributed product and thereby reduce yields of the desired redistributed product. Less than 1 mole of methyl chloride, per mole of sodium, is stoichiometrically too little. 1.1 moles of methyl chloride provides an operable amount and 5 moles of methyl chloride per mole of sodium afford a practical upper limit, even if only to conserve space in the interior of the vessel for maximum production of desired products. The range of 0.11 to 0.44 mole of tetraethyl lead per mole of sodium affords sufficient tetraethyl lead for the formation of a practical range of redistribution mixture as used in commercial antiknock fluids. These include and vary between the compositions shown in mixtures 1 and 2 below, i.e., mixtures comprising:

| Tetraalkyl lead | Mole percent composition | |
| --- | --- | --- |
|  | Mixture 1 | Mixture 2 |
| Tetramethyl lead | 27.6 | 0.1 |
| Trimethylethyl lead | 49.5 | 3.3 |
| Dimethyldiethyl lead | 19.5 | 19.5 |
| Methyltriethyl lead | 3.3 | 49.5 |
| Tetraethyl lead | 0.1 | 27.6 |

It will also be appreciated that the ratio of charge volume to vessel volume must be maintained within practical limits. If this ratio is too small, agitation is poor, too much methyl chloride is vaporized from the methylation, chiefly a liquid phase reaction, and the vessel is not used at a maximum practical level of production. On the other hand, the vessel must never be liquid full. Because of the reactivity of the above catalysts and the sodium lead alloy with moisture or oxygen, vessel charging and subsequent operations are carried out in an inert dry gas atmosphere, preferably a dry nitrogen atmosphere. Helium, argon and neon may also be used but are vastly more expensive. Volatile hydrocarbons, e.g., methane, ethane, propane, etc., while useful, add considerably to flammability hazards.

After charging is completed, the vessel is sealed and agitation by a suitable means is begun. The vessel contents are heated by a suitable heating means in about 20 minutes from about 50° C. or lower initial temperature to between about 100° and about 105° C. In the next period of about 10 minutes, the vessel contents are heated to between about 110° C. and about 130° C. and then maintained at such temperature for about another 55 to 70 minutes to substantially complete both methylation and redistribution. To achieve the unexpected efficiency of this process, substantial adherence to these times and temperatures is essential. Lower heat-up rates and temperatures decrease reaction rate and at temperatures above 130° C. there is danger of decomposition of the tetramethylethyl leads. For safety, the pressure is generally kept below about 500 p.s.i.g. by, for example, external cooling or reflux cooling with excess methyl chloride. Preferably the pressure is kept below about 300 p.s.i.g. Faster heat-up rates than those described above are impracticable since the vigorously exothermic reaction would make control of temperature and pressure extremely difficult. Next the vessel contents are cooled, discharged and the redistributed tetramethylethyl leads recovered by usual means such as steam distillation or extraction of the reaction mass with a liquid hydrocarbon which is a solvent for such alkyl lead mixtures.

Preferred embodiment

In the preferred embodiment of this invention a dry pressure vessel is purged with dry nitrogen and charged at 50° C. or lower with comminuted monosodium lead alloy (NaPb), about 0.013 to about 0.026, most preferably about 0.018, mole, per mole of sodium, of anhydrous aluminum chloride in particulate form, about 1.5 to 3, preferably about 2.1, moles, per mole of sodium, of methyl chloride and about 0.22 mole of tetraethyl lead per mole of sodium. Optionally, sufficient dry toluene, as an inhibitor for the thermal decomposition of the alkyl leads, is added to provide between about 5 weight percent and about 15 weight percent of toluene based on the weight of the tetramethylethyl lead products and from 0.5 to 5 weight percent of the sodium lead alloy of comminuted graphite is added which serves to ease agitation by internal lubrication in the vessel. The vessel is sealed, agitation is started and the contents of the vessel are heated as described above. Next, the vessel contents are cooled to about 50° C. or lower, and discharged. The redistributed tetramethylethyl lead mixture is recovered by usual means such as suggested above. It will be appreciated that at about 100° C. and above, the methylation reaction can be vigorously exothermic and provide sufficient heat so no external heating is required and cooling may be required, either by means of external cooling means or by refluxing of excess methyl chloride. Since heating-up to 100° C. or more in about 20 minutes is more rapid than is usual in methylation reactions and since exothermism can become vigorous during this heating up period, it will be appreciated that adequate heat removal capacity must be available, for example, through adequate external cooling or reflux cooling capacity, or both.

Examples

In order to more fully illustrate this invention, the preferred mode of carrying it into effect and the advantageous results obtained, the following examples are given wherein parts are by weight unless otherwise indicated.

EXAMPLE I

A dry steel bomb of about 200 to about 250 parts water capacity is charged under nitrogen with 80 parts (0.35 mole of Na) of comminuted sodium lead alloy (NaPb), 0.6 part (0.0045 mole) of powdered, anhydrous aluminum chloride, four 9 to 10 mm. diameter steel balls to aid internal agitation and 25 parts (0.077 mole) of tetraethyl lead. The bomb, cooled with solid carbon dioxide, is charged with 36 parts (0.71 mole) of methyl chloride and sealed. The bomb contents are heated in about 20 minutes under agitation to between 100 and 105° C. and in about 10 more minutes to about 114° C. at which temperature the contents remain for an additional 55 minutes. The bomb is cooled, opened and the contents extracted with hexane. Analysis of aliquots of the hexane extract solution show that the yield of tetramethyl lead would have been 84 mole percent before redistribution, based on the original amount of sodium lead alloy and that the redistribution is complete to an extent of 99 mole percent.

The composition of the redistributed product from this operation comprises:

| Tetraalkyl lead | Mole percent |
|---|---|
| Tetramethyl lead | 5 |
| Trimethylethyl lead | 25 |
| Dimethyldiethyl lead | 42 |
| Methyltriethyl lead | 24 |
| Tetraethyl lead | 4 |

EXAMPLE II

A multiple bomb experiment carried out substantially as in Example I, except that the reaction is interrupted by chilling bombs rapidly (to the temperature of a solid carbon dioxide-acetone bath) at intervals before and after the 85 minute heating-up and heating period. This experiment gives the results shown in the drawing. Curve A of the drawing represents the mole percent yield of tetramethyl lead while curve B represents the mole percent yield or mole percent completion of redistribution.

The fact that redistribution is not significant until after methylation is nearly complete is illustrated by results from a bomb chilled at points U and V of the drawing, i.e., at about 51.5 minutes. At these points methylation, as measured by tetramethyl lead yield, is 75 percent complete, that is, over 89 percent of the tetramethyl lead which is expected to be formed is already formed, while only 20.5 percent of complete redistribution is attained. Even at the intersection point W, of curves A and B, redistribution is still only about 80 percent complete while methylation is substantially complete.

EXAMPLE III

Example I is repeated exactly except that the bomb contents are heated very rapidly, i.e., in 15 minutes to about 110° C. and held there for 1 hour. There results a 76 mole percent yield of tetramethyl lead and only 13 mole percent completion of redistribution, indicating again that methylation can be substantial before redistribution becomes significant.

The results in Examples II and III are particularly surprising since it has been found that, in a separate operation, contacting a mixture of the amount of tetramethyl lead (about 21 parts) produced in Example I and 25 parts of tetraethyl lead with 0.6 part of anhydrous aluminum chloride gives complete redistribution in 5 to 10 minutes at room temperature, i.e., at about 25° C. Thus, it is completely unexpected that redistribution should lag behind methylation under the conditions of the foregoing examples. While it is not intended to limit the scope of this invention by a theoretical discussion of the phenomenon involved, it is speculated that the catalyst is tied up during methylation in some manner and only becomes free for redistribution as methylation approaches completion.

EXAMPLE IV

The effects of varying only the amounts of methyl chloride and only the amounts of aluminum chloride are illustrated by the following bomb results obtained essentially as described in Example I:

| Reagent changed | New parts by wt. of reagents | Mole per mole of NaPb | Mole percent Yield TML | Redistribution |
|---|---|---|---|---|
| Methyl chloride | 20 | 1.1 | 76 | 73 |
| Methyl chloride | 70 | 4 | 90 | 87 |
| Aluminum chloride | 0.3 | 0.006 | 65 | 28 |
| Aluminum chloride | 1.2 | 0.026 | 85 | 100 |

In comparison with Example I, the smaller amount of methyl chloride, about 10 moles percent excess over the available sodium, is not quite enough to afford complete methylation. With the larger amount of methyl chloride, methylation is good but redistribution is lessened. Likewise too little aluminum chloride hurts both yields while doubling the normal amount of aluminum chloride does not substantially help methylation nor change redistribution yield significantly.

EXAMPLE V

Another set of bomb runs demonstrates the operability of trimethyl aluminum, $(CH_3)_3Al$, and ethyl-aluminum sesquichloride, $(C_2H_5)_3Al_2Cl_3$. In these runs, the time above 100° C. was only 55 minutes, not 65 minutes as in Example I. In the following table X refers to the molar proportion of aluminum chloride in Example I.

| Catalyst used | Proportion | Mole Percent yield TML | Redistribution |
|---|---|---|---|
| $AlCl_3$ | X | 82 | 65 |
| $AlCl_3$ | 1.5X | 78 | 100 |
| $(CH_3)_3Al$ | 1.5X | 85 | 72 |
| $(CH_3)_3Al$ | 3X | 89 | 98 |
| $(C_2H_5)_3Al_2Cl_3$ | 1.4X | 84 | 64 |
| $(C_2H_5)_3Al_2Cl_3$ | 1.6X | 84 | 81 |

EXAMPLE VI

When the quantities of tetraethyl lead used in Example I are changed the following results are obtained.

| Quantity of tetraethyl lead, parts | Mole percent yield TML | Redistribution |
|---|---|---|
| 14 | 84 | 84 |
| 50 | 65 | 88 |

These results indicate that other quantities of tetraethyl lead may be used, but also that under the preferred reaction conditions, one obtains the composition of tetramethylethyl lead redistribution product of Example I and also better yield of the redistribution product.

These examples show that substantially complete methylation and redistribution may be economically achieved by the process of this invention in a single vessel by carefully choosing the proper proportions of the recited reagents. Further, by rapid heat-up time, both methylation and redistribution may surprisingly be accomplished in approximately the same length of time taken to achieve methylation alone by prior art methods.

Since many different embodiments of the invention may be made without departing from the spirit and scope thereof, it is to be understood that the invention is not limited by the specific illustrations except to the extent defined in the following claims.

The embodiments of the present invention in which an exclusive property or privilege is claimed are defined as follows:

1. A process for producing redistribution mixtures containing tetramethyl lead, trimethylethyl lead, dimethyldiethyl lead, methyltriethyl lead and tetraethyl lead which comprises:
   (A) contacting, in a single pressure vessel under an inert atmosphere, sodium lead alloy with from about 0.006 to about 0.04 mole, per mole of sodium, of a catalyst selected from the group consisting of an aluminum halide, an alkylaluminum and an alkylaluminum halide, from about 1.1 to 5.0 moles of methyl chloride per mole of sodium and from about 0.11 to 0.44 mole of tetraethyl lead per mole of sodium;
   (B) heating said vessel contents under agitation to between about 100° C. and 105° C. in about 20 minutes, to between about 110° C. and 130° C. in about another 10 minutes and maintaining said temperature at between about 110° C. and 130° C. for about an additional 55 to 70 minutes to accomplish both substantially complete methylation and substantially complete redistribution; and
   (C) recovering the redistributed tetramethylethyl leads.

2. Claim 1 wherein the catalyst is selected from the group consisting of aluminum chloride, trimethylaluminum and ethylaluminum sesquichloride.

3. Claim 2 wherein said catalyst is aluminum chloride.

4. A process for producing redistribution mixtures of tetramethylethyl leads in a single, agitated pressure vessel under a dry nitrogen atmosphere comprising:
 (A) charging said vessel with comminuted sodium lead alloy, about 0.013 to about 0.026 mole of particulate aluminum chloride per mole of sodium, about 1.5 to 3.0 moles of methyl chloride per mole of sodium and about 0.22 mole of tetraethyl lead per mole of sodium;
 (B) heating said vessel contents under agitation to between about 100° C. and 105° C. in about 20 minutes, to between about 110° C. and 130° C. in about another 10 minutes and maintaining said temperature at between about 110° C. and 130° C. for about an additional 55 to 70 minutes to accomplish both substantially complete methylation and substantially complete redistribution; and
 (C) recovering the redistributed tetramethylethyl leads.

5. Claim 4 wherein said vessel is also charged with from about 5 to about 15 percent by weight dry toluene, based on the weight of the redistributed tetramethylethyl leads, and with from about 0.5 to about 5.0 percent by weight comminuted graphite, based on the weight of said sodium lead alloy.

References Cited

UNITED STATES PATENTS

| 2,270,109 | 1/1942 | Calingaert et al. |
| 3,048,610 | 8/1962 | Jarvie et al. |
| 3,072,694 | 1/1963 | Tullio _____ 260—437 |
| 3,151,141 | 9/1964 | Arimoto. |

OTHER REFERENCES

Calingaert et al.: J. Amer. Chem. Soc., vol. 61, pp. 2748–60 (1939).

TOBIAS E. LEVOW, Primary Examiner

H. M. S. SNEED, Assistant Examiner

U.S. Cl. X.R.

252—386